D. P. WEIR.
BRAKE FOR VEHICLES.
APPLICATION FILED OCT. 28, 1913.
1,134,570.
Patented Apr. 6, 1915.
3 SHEETS—SHEET 1.
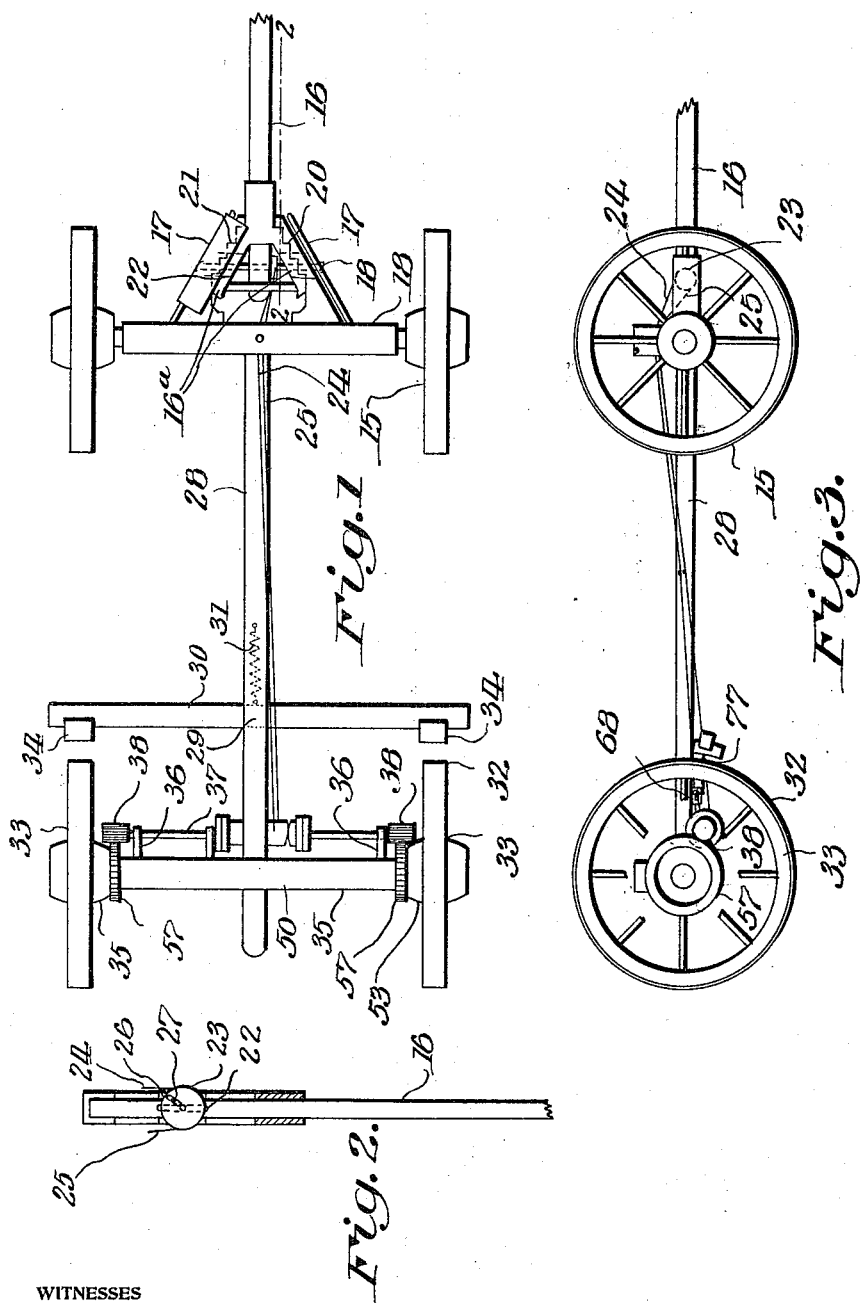

D. P. WEIR.
BRAKE FOR VEHICLES.
APPLICATION FILED OCT. 28, 1913.
1,134,570.
Patented Apr. 6, 1915.
3 SHEETS—SHEET 2.
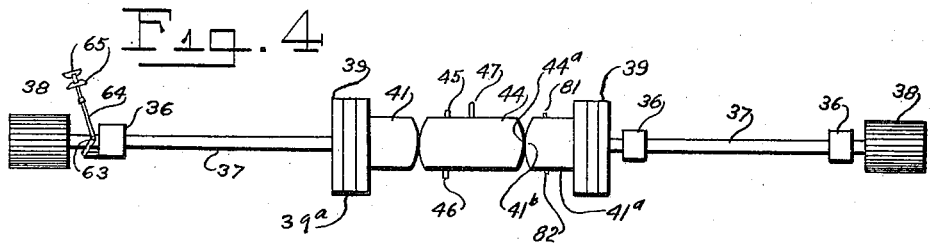
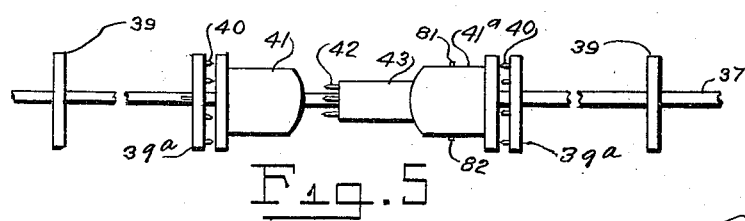
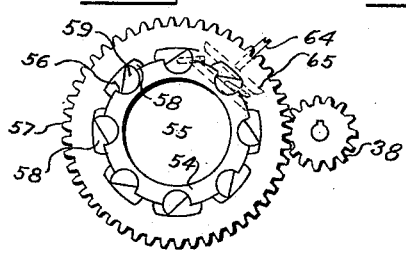
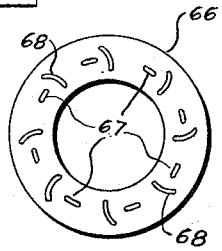
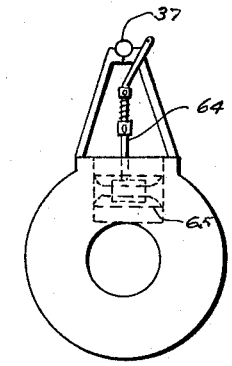
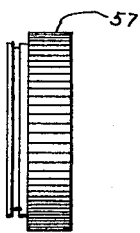
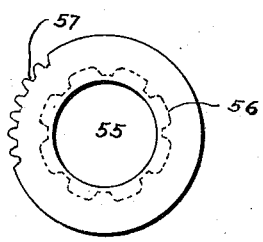
WITNESSES
Frank M. Warner
INVENTOR
David P. Weir
BY
L. L. Westfall
ATTORNEY

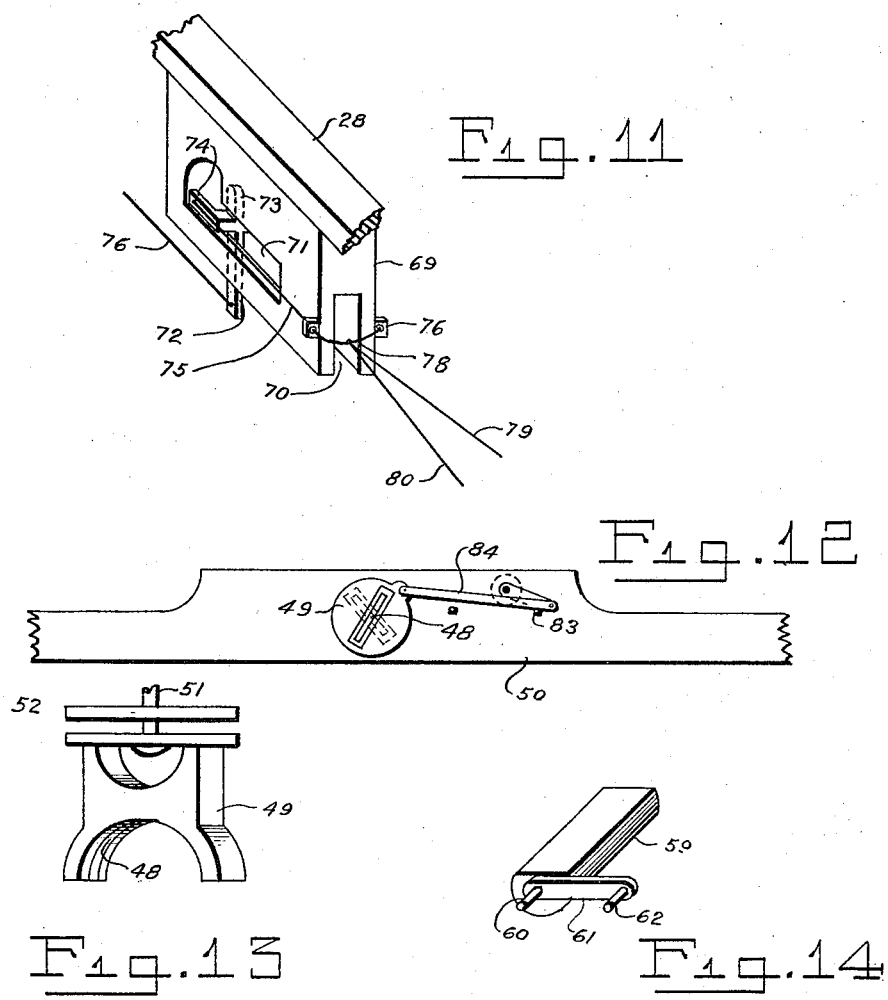

UNITED STATES PATENT OFFICE.

DAVID P. WEIR, OF RATHDRUM, IDAHO.

BRAKE FOR VEHICLES.

1,134,570.  Specification of Letters Patent.  Patented Apr. 6, 1915.

Application filed October 28, 1913. Serial No. 797,915.

*To all whom it may concern:*

Be it known that I, DAVID P. WEIR, a citizen of the United States of America, residing at Rathdrum, in the county of Kootenai and State of Idaho, have invented certain new and useful Improvements in Brakes for Vehicles, of which the following is a specification.

This invention pertains to vehicle brakes. The primary object of the invention is to provide a vehicle brake which is economical in construction and reliable in operation.

The invention belongs to that class of brakes where the vehicle tongue is slidable between the hounds of the vehicle, as when drawing down an incline, the brakes in such case engage the wheels automatically, the rearward movement of the tongue being caused by the "hold back" action of the team.

The invention has reference to certain novel features fully explained herein and include shoes adapted to come in contact with the tires of the wheels to effectually check the rotation of the same, a rotating mechanism to operate the same and a governor to throw the rotating mechanism in and out of gear. The mechanism is adapted for setting the brakes, both when the team is ascending a grade with the vehicle, to allow the team to rest, and when descending a grade to check the descent of the vehicle.

With these and other objects in view, the invention consists of the combination and arrangement of parts as described herein, pointed out in the claims and illustrated in the drawings in which, Figure 1 is a top plan view of a wagon truck with the brake mechanism attached, Fig. 2, is a sectional view taken on the line 2—2 of Fig. 1, Fig. 3, is a side elevation of Fig. 1, Fig. 4, is a view of the governing mechanism attached to the rear axle together with a gear at each end thereof, Fig. 5 is a disassembled view of Fig. 4, with the gears and the rotatable sleeve omitted, Fig. 6, is a side view of the locking mechanism and coöperating gears, Fig. 7, is a detail view of a plate entering into the construction of Fig. 6, Fig. 8, is a view of the locking mechanism shown in Fig. 6, the same being incased and having attached thereto its supporting mechanism and governing apparatus, Fig. 9, is an end view of Fig. 6, Fig. 10, is a detail view of the larger gear shown in Fig. 6, incased in a shield, Fig. 11, is a view of a section of the wagon reach containing an illustration of the manner of transmitting the movement from the friction clutch to the brake beam, Fig. 12, is a broken-away view of the rear axle showing a reversing mechanism used in connection with the governing construction, Fig. 13, is an enlarged detail view of the reversing guide, and Fig. 14, is a detail view of one of the locking bolts used in the construction of the locking device together with an arm attached thereto as a means whereby the same is operated.

I have shown a wagon truck 15 having a tongue 16 (Fig. 1) provided with wings 16$^a$ secured between the hounds 17 by means of a pin 18, the hounds 17 being secured to the front axle 19. The sides of the tongue 16 are provided with dogs 20 adapted for engagement with notches 21 in the wings 16$^a$. The tongue 16 is slidably adjusted to the pin 18 by means of the horizontally arranged slot 22 in the tongue 16. Rotatably attached to the pin 18 adjacent to the tongue 16 is a block 23 to the opposite sides of which are secured cables 24 and 25. Cut into the block 23 is a slot 26. Extending from the tongue 16 and reaching into the slot 26 is a pin 27.

Suspended from the reach 28, as at 29, is the brake beam 30, normally held in the position shown in Fig. 1 by the coil spring 31. Attached to the ends of the brake beam 30 and adapted for engagement with the tires 32 of the rear wheels 33, are shoes 34.

Attached to the rear axle 35 by means of the brackets 36 is a shaft 37. The shaft 37 is slidable in the brackets 36. Rigidly secured to each end of the shaft 37 is a gear 38. Also rigidly secured to the shaft 37 are collars 39 (Fig. 4). Loosely engaging the shaft 37 are plates 39$^a$ to which are rigidly secured as by pins 40 the cylindrical portions 41 and 41$^a$, also engaging the shaft 37. Between the cylindrical portions 41 and 41$^a$ and rigidly secured thereto, as by the pins 42, is a sleeve 43 also engaging the shaft 37. Loosely engaging the sleeve 43 is a cylindrical cam 44. The sleeve 43 serves as a spool for the cam 44. The cables 24 and 25 leading from the block 23 are attached to the pins 45 and 46 respectively reaching from the rotatable cam 44. The pin 47 reaching from the cam 44 engages the groove 48 in the guide block 49 normally held in such a manner that the slot 48 is at an inclination (Figs. 12 and 13), said guide block being secured to the front face of the rear axle 50 as by the pin 51 passing through the axle, one of the plates 52 being on each side of the said axle. Attached to the inner ends of the hubs 53 of the rear wheels are collars 54 (Fig. 6) having an opening 55 in the center for the passage of the rear hubs 53. The outer edge of the collars 54 is provided with semi-circular cutouts 56. Engaging the collars 54 are gears 57 meshing with the gears 38 on the shaft 37. Cut-outs 58 are made in the gear wheel 57. Bolts 59 are adapted to fit the semi-circular openings 56, the respective parts 54, 57 and 59 being assembled as shown in Fig. 6.

The bolts (Figs. 6 and 14) have attached thereto, as by the pins 60, arms 61, from which extend pins 62. Pinned to the shaft 37 as at 63 (Fig. 4) are toggles 64 carrying at their outer ends a pair of dogs 65. The plate 66 is assembled with the parts shown in Fig. 6, the pins 60 (Fig. 14) extending through the straight slots 67 and the pins 62 extending through the oblong curved slots 68. The toggles 64 extend past the gears 54 with the dogs 65 engaging the pins 62.

Referring now to the rotatable member 44 (Fig. 4), the same has a shoulder 44$^a$ normally in the position shown in Fig. 4 and the cylindrical portion 41$^a$ has shoulders 41$^b$, and in the positions shown in Fig. 4 attached to the reach 28 as at 68 (Fig. 3) is a block 69 (Fig. 11) having a horizontal cut-out 70 in the bottom thereof and slots 71 on the sides thereof connecting with the said cut-out 70. Within the cut-out 70 is stationed a lever 72 fulcrumed as at 73 and having lateral extensions 74 to which is attached the cable 75, the cable 75 passing through the eyes 76 and across the front of the block 69. To the bottom of the lever 72 is secured a cable 76 which connects with the brake beam 30 as at 77 (Fig. 3). To the cable 75, as at 78, is secured two cables 79 and 80 respectively reaching to and connecting with the pins 81 and 82 respectively on the cylindrical portion 41$^a$.

When the team hitched to the wagon throws back its weight on the tongue 16, the same slides backward over the pin 18 (Fig. 1) and the pin 27 in the slot 26 of the block 23 rotates the block 23 thereby drawing on the cable 24, which rotates the cam 44, so that the shoulders 44$^a$ and 41$^b$ strike each other causing the clutch to expand and engage the collars 39, the pin 47 (Fig. 4) following the groove 48 (Fig. 12) causing the shaft 37 to shift sidewise which draws on the toggle 64 changing the position of the dogs 65 (Fig. 4) thereby carrying the arm 61 with them and tilting the bolts 59 to the position shown in Fig. 6. This locks the gear 57 to the collar 54 so that the rotation of the wheels of the wagon in a forward motion rotates the gears 57 and 38 and consequently the shaft 37, drawing on the cables 79 which carries the lever 72 rearward and the cable 76 draws the brake beam 30 backward setting the shoes 34 against the tires 32 of the rear wheels 33. A forward movement of the tongue 16 reverses the operation and the coil spring 31 draws the brake beam forward releasing the brakes. The guide block 49 may be manually rotated by the crank 83, connected by the arm 84 to the guide block 49 so that the groove 48 slopes in the opposite direction and the brakes will be set by the same mechanism with any movement of the team the same being useful to permit the teamster to leave the team standing.

What I claim is,

1. A brake for vehicles, having a tongue slidably adjusted between hounds attached to the fore truck, comprising a brake beam suspended from the reach of a vehicle and carrying shoes adapted for engagement with the tires of the wheels of the vehicle, a block rotatably attached to the side of the tongue, an oblong slot in said block, a pin attached to the tongue and engaging said slot, two cables attached to said block on opposite sides thereof, a transversely arranged shaft suspended from the rear axle of the vehicle and adapted to rotate, said shaft carrying a gear at each end thereof, and two cylindrical portions secured thereto and a cam rotatable thereon, the cables reaching from the block on the tongue attached to opposite sides of said cam, a connection between the brake beam and one of said cylindrical portions attached to said transversely arranged shaft, whereby by the rotation of said shaft the brake beam is carried rearward to bring the shoes thereon in contact with the tires of the wheels of the vehicle, gears on the rear hubs meshing with the gears on the ends of the said transversely arranged shaft and means for locking and unlocking said gears with collars on the hubs of the rear wheels.

2. A brake for vehicles, having a tongue slidably adjusted between hounds attached to the fore truck, comprising a brake beam suspended from the reach of a vehicle and carrying shoes adapted for engagement with the tires of the wheels of the vehicle, a block rotatably attached to the side of the tongue, an oblong slot in said block, a pin attached to the tongue and engaging said slot, two cables attached to said block on opposite sides thereof, a transversely arranged shaft suspended from the rear axle of the vehicle and adapted to rotate, said shaft carrying a gear at each end thereof, and two cylindrical portions secured thereto and a cam rotatable thereon, the cables reaching from the block on the tongue attached to opposite sides of said cam, a connection between the brake beam and one of said cylindrical portions attached to said transversely arranged shaft, whereby by the rotation of said shaft the brake beam is carried rearward to bring the shoes thereon in contact with the tires of the wheels of the vehicle, gears on the rear hubs meshing with the gears on the ends of the said transversely arranged shaft and means for locking and unlocking said gears with the collars on the hubs of the rear wheels, together with means for returning the brake beam to normal position after the locking mechanism has been released, and means for manually reversing the action of the locking mechanism to automatically set the brakes on any movement of the wheels.

In testimony whereof I affix my signature in presence of two witnesses.

DAVID P. WEIR.

Witnesses:
HENRY WODDELL,
E. P. DYER.

Copies of this patent may be obtained for five cents each, by addressing the "Commissioner of Patents, Washington, D. C."